United States Patent
Slatton et al.

(10) Patent No.: US 12,436,709 B1
(45) Date of Patent: Oct. 7, 2025

(54) PERSISTENT OBJECT STORAGE WITH SEQUENTIAL UPDATES

(71) Applicant: Amazon Technologies, Inc., Seattle, WA (US)

(72) Inventors: Thomas Grant Slatton, Seattle, WA (US); Seth W. Markle, Seattle, WA (US); James Alexander Bornholt, Austin, TX (US); Rajeev Joshi, La Canada Flintridge, CA (US); Andrew Kent Warfield, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 230 days.

(21) Appl. No.: 17/364,820

(22) Filed: Jun. 30, 2021

(51) Int. Cl.
- *G06F 3/00* (2006.01)
- *G06F 3/06* (2006.01)
- *G06F 16/22* (2019.01)

(52) U.S. Cl.
CPC .......... *G06F 3/0655* (2013.01); *G06F 3/0604* (2013.01); *G06F 3/0679* (2013.01); *G06F 16/2246* (2019.01)

(58) Field of Classification Search
CPC .. G06F 12/0253; G06F 3/0655; G06F 3/0604; G06F 16/2246
See application file for complete search history.

(56) References Cited

U.S. PATENT DOCUMENTS

| | | | |
|---|---|---|---|
| 9,236,086 B1 * | 1/2016 | Burton | G11B 20/10527 |
| 9,952,771 B1 * | 4/2018 | Bigman | G06F 3/0659 |
| 10,474,656 B1 * | 11/2019 | Bronnikov | G06F 16/217 |
| 10,739,996 B1 * | 8/2020 | Ebsen | G06F 16/1727 |
| 2015/0278397 A1 * | 10/2015 | Hendrickson | G06F 16/137 707/798 |
| 2017/0024160 A1 * | 1/2017 | Feldman | G06F 3/064 |
| 2017/0185312 A1 * | 6/2017 | Smith | G06F 3/061 |
| 2020/0250040 A1 * | 8/2020 | Vankamamidi | G06F 11/1435 |

(Continued)

OTHER PUBLICATIONS

Vytautas Astrauskas et al, "Leveraging Rust Types for Modular Specification and Verification", dated Oct. 2019, pp. 1-30.

(Continued)

*Primary Examiner* — Reginald G Bragdon
*Assistant Examiner* — Michael L Westbrook
(74) *Attorney, Agent, or Firm* — S. Scott Foster; Kowert, Hood, Munyon, Rankin & Goetzel, P.C.

(57) ABSTRACT

An object storage data store may be implemented using storage devices providing multiple extents, where individual ones of the extents include multiple independently addressable, contiguous blocks and where updating an extent is performed by updating the respective independently addressable, contiguous blocks sequentially using a series of write operations. The storage devices may include shingled magnetic recording devices and may include conventional persistent storage devices. The key value data store may implement a superblock structure, index structure, and data store structure using respective portions of the multiple extents, where updates to each of the structures is performed sequentially using a series of write operations. The key value data store may further implement a cache for the index structure to minimize input-output (IO) density of the object storage data store.

19 Claims, 13 Drawing Sheets

(56) References Cited

U.S. PATENT DOCUMENTS

2020/0409601 A1* 12/2020 Helmick .............. G06F 3/0659

OTHER PUBLICATIONS

Katherine E. Coons et al, "Bounded Partial-Order Reduction", dated 2013, pp. 1-16.
Magic Pocket Hardware Engineering Teams, "Extending Magic Pocket Innovation with the first petabyte scale SMR drive deployment", dated Jun. 12, 2018, pp. 1-12.
Lanyue Lu et al, "WiscKey: Separating Keys from Values in SSD-conscious Storage", dated Feb. 2016, pp. 1-17.
Abutalib Aghayev et al, "Evolving Ext4 for Shingled Disks", dated 2017, pp. 1-17.
Jeffrey Dean et al, "The Tail at Scale". dated Feb. 2013, (vol. 55, No. 2). pp. 74-80.
Brad Calder et al, "Windows Azure Storage: A Highly Available Cloud Storage Service with Strong Consistency", SOSP '11, Oct. 23-26, 2011, Cascais, Portugal, Copyright © 2011 ACM pp. 143-157.
Doug Beaver et al, "Finding a needle in Haystack: Facebook's photo storage", OSDI'10: Proceedings of the 9th USENIX conference on Operating systems design and implementation, Oct. 2010, pp. 47-60.
Subramanian Muralidhar et al, "Facebook's Warm BLOB Storage System", In the Proceedings of the 11th USENIX Symposium on Operating Systems Design and Implementation, Oct. 2-14, pp. 383-398.

* cited by examiner

Configure storage devices to provide multiple extents for an extent store, each extent including multiple contiguous, independently addressable blocks, where writing data to an extent is performed by writing blocks sequentially beginning at a write pointer maintained for each extent 800

↓

Configure a data store and an index store each implemented using respective portions of the multiple extents 810

↓

Receive a request to write an object 820

↓

Write the object to the data store, the object divided into one or more portions with each portion written to an individual extent sequentially starting at the current write pointer for each respective extent 830

↓

Update an index stored in the index store, the update identifying the object in the data store 840

FIG. 7

PERSISTENT OBJECT STORAGE WITH SEQUENTIAL UPDATES

BACKGROUND

Many applications are being implemented using network-accessible services, such as the kinds of virtualized computing services, storage services and the like which may be provided using the resources of provider networks or public cloud environments. Virtualized computing services, for example, may enable clients to utilize essentially unlimited amounts of compute power for their applications, with additional resources being automatically deployed as the application workload grows. Similarly, database and storage services may allow clients to store vast amounts of data using fast high-availability configurations.

A number of different types of data models may be supported by these database and data storage services. In some cases, for example, relational data models may be used, while in other cases, key-value or "noSQL" models may be used. Services that enable clients to store large objects (e.g., as collections of bytes that are typically opaque to the service provider, with no requirements for schemas or structure for accessing the objects, which are sometimes referred to as unstructured or semi-structured data objects) represent another popular alternative. For example, some object storage services may allow clients to create individual objects that may reach terabytes in size, and access the objects using simple web services requests (such as "get", "put", and the like) directed to respective unique URLs designated for the objects.

As the industry steadily increases drive density, disk drive manufacturers are shifting to zonal drive technologies like Shingled Magnetic Recording (SMR) hard drives which achieve higher density by placing restrictions on how software writes data to the drive. While these new spinning storage media continue to grow in capacity, performance improvements do not progress at the same rate thus introducing new or exacerbating existing bottlenecks in disk storage. Therefore, a new approach to object storage is needed to enable these new higher density storage devices while simultaneously minimizing input-output (IO) demands to allow for cost effective object storage on high density storage media.

BRIEF DESCRIPTION OF THE DRAWINGS

FIG. 7 is a flow chart illustrating a method of implementing storing of a data object using sequential update operations to minimize input-output density, according to some embodiments.

Figure 1:
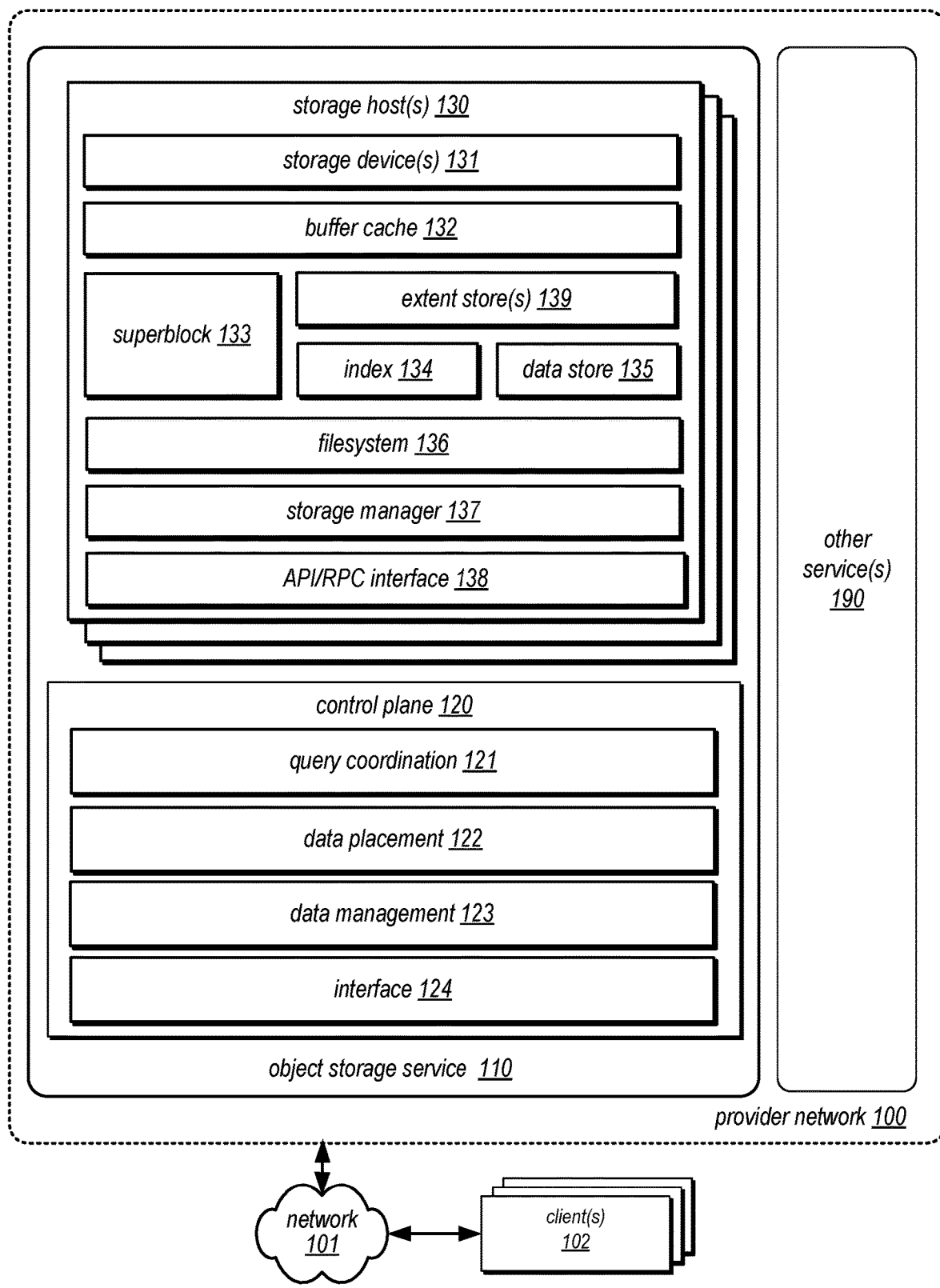
FIG. 1 is a logical block diagram illustrating a provider network that offers an object storage service that implements sequential update operations to minimize input-output density.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION

An object data store implementing persistent storage using predominantly or exclusively sequential updates may be implemented in various embodiments, as described herein. These various embodiments of an object data store may include further features to minimize that rate of input-output (IO) required of storage devices, thus making these object data store embodiments suitable not only for zonal drive technologies like Shingled Magnetic Recording (SMR) hard drives but also for conventional storage devices as IO density is reduced over conventional object storage techniques.

An object data store may, for example, enable clients to create, access and manipulate data items or objects comprising collections of data (e.g., bytes) for which no specific schema or information indicating internal structure (e.g., without storing structure indicating fields or columns of the object) may be required to store the object, at least at the time of object creation or instantiation, in some embodiments. From the perspective of the object data store, the semantics of the contents of individual data items may typically be unknown by default—e.g., the data types of subsets of an individual data objects, even if it is several gigabytes or even petabytes in size, may not be provided to the object data store at the time that the item is stored at the object data store in various embodiments. Of course, the semantics and structure (if any) of the content of data objects may be well known to the clients on whose behalf the objects are stored, in some embodiments.

Data objects may be accessed (e.g., via read requests submitted via programmatic interfaces) and analyzed for a variety of applications in different embodiments at the object data store. For at least some applications, only a relatively small subset of the contents of a given data object may be required. For example, consider a simple example scenario in which a given data object comprises the content of a large number of transaction records of an e-retailer, with a given transaction record indicating the name of a sold item, a category of the item, a timestamp indicating when the transaction occurred, a price of the item, and address information of the purchaser. The data object may comprise a byte sequence or string representing 10,000 such transaction records, e.g., with a selected delimiter (e.g., a new line character) separating the content of different transaction records, and another delimiter (e.g., a comma or tab) separating fields within a transaction record.

This specification includes a general description of a provider network which may implement an object storage service that implements an object data store that uses sequential updates to minimize IO density and to exploit modern zonal drive technologies. Various examples of an object storage service are discussed, including different components, or arrangements of components that may be employed as part of implementing the object storage service. A number of different methods and techniques to implement an object store are discussed, some of which are illustrated in accompanying flowcharts. Finally, a description of an example computing system upon which the various components, modules, systems, devices, and/or nodes may be implemented is provided. Various examples are provided throughout the specification.

FIG. 1 is a logical block diagram illustrating a provider network that offers an object storage service that implements sequential update operations to minimize input-output density. Provider network 100 may be set up by an entity such as a company or a public sector organization to provide one or more services (such as various types of cloud-based computing or storage) accessible via the Internet and/or other networks 101 to clients 102. Provider network 100 may include numerous data centers hosting various resource pools, such as collections of physical and/or virtualized computer servers, storage devices, networking equipment and the like, needed to implement and distribute the infrastructure and services offered by the provider network 100. In some embodiments, provider network 100 may provide virtual storage services, such as object storage service 110. Object storage service 110 may offer client(s) 102 virtual containers or buckets in which to store one or multiple data objects.

In various embodiments, provider network 100 may implement object storage service 110 for performing storage operations. Object storage service 110 may be a storage system, composed of a pool of multiple storage hosts 130 (e.g., server storage systems), which provide object storage for storing data at storage devices 131 according to the object storage scheme discussed below in FIG. 2. Data buckets may be mapped to particular client(s) (e.g., a particular customer account of provider network 100), providing unstructured object storage (e.g., other persistent storage) for data objects which may be retrieved via object keys.

Figure 13:
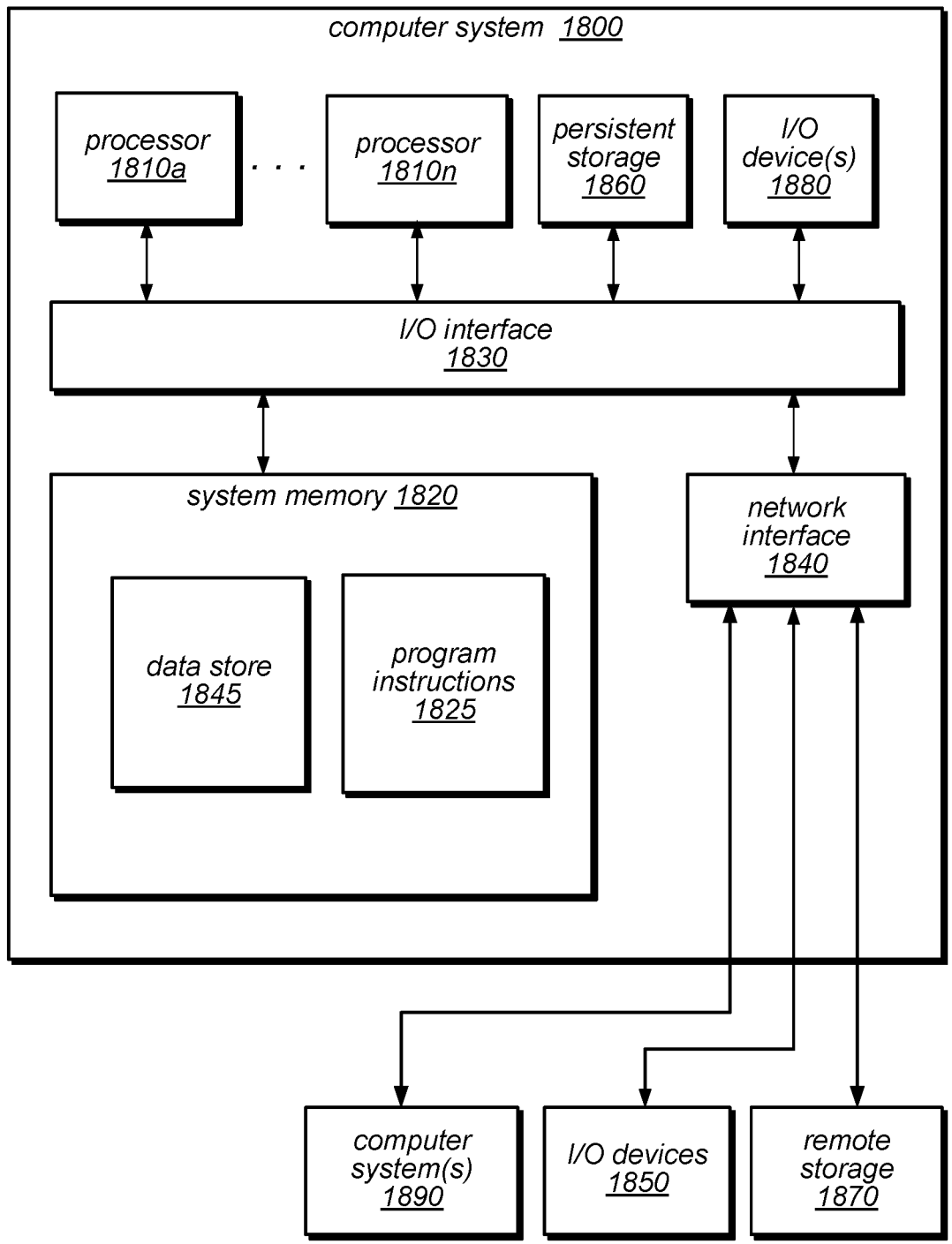
FIG. 13 is a block diagram illustrating an example computing system, according to some embodiments.

Storage hosts 130 may be one or more computing systems or devices, such as a storage server or other computing system (e.g., computing system 1800 described below with regard to FIG. 13). Each storage host may manage separate storage devices 131. Storage hosts may also provide multi-tenant storage. For example, in some embodiments, one storage host may maintain a data object (or portion of a data object) for one entity (e.g., a particular client or account of object storage service 110), while another data object maintained at the same storage host may be maintained for another entity (e.g., a different account). Storage hosts may persist their respective data objects in one or more persistent storage devices 131 (e.g., hard disk drives, solid state drives, shingled magnetic recording (SMR) drives, etc.) that may be directly attached to a computing system or device implementing the respective storage host, in some embodiments. Storage hosts may implement different persistent storage devices, in some embodiments. For example, some storage hosts may implement solid state drives (SSDs) for persistent block storage, while other storage hosts may implement SMR drives or other magnetic-based persistent storage devices. In this way, different specifications, and other performance characteristics may be provided according to the persistent storage devices implemented at the storage host.

Object storage service may manage and maintain data objects in a variety of different ways. Storage manager 137 may be implemented at storage hosts 130 respectively to manage data stored in storage devices. Different durability schemes may be implemented for some data objects among two or more storage hosts as a partitioned, sharded, and/or replicated data object, in some embodiments. Data may be maintained in data devices 131 in such a way as to provide security and privacy guarantees for client(s) 202. Storage managers 137 may enforce access policies for individual data objects or buckets, restricting access to data in data objects or buckets to those requestors that satisfy the access policy (e.g., by presenting appropriate identification or credentials). In this way, data stored in different data objects or buckets on the same storage host for different clients may be confidentially maintained so that an unauthorized request to access data may not be processed (even if the requestor has the right to access another data object or bucket hosted at the same storage host), in some embodiments. Storage managers 137 may handle access requests, such as get, put, create, or delete data objects. As discussed in detail below with regard to FIG. 3, storage manager may implement query engines (not shown) to perform queries to objects (or portions thereof) stored at storage hosts 130, in some embodiments.

Object storage service 110 may implement control plane 120 to assist in the operation of object storage service 110. In various embodiments, control plane 120 assists in managing the availability of data objects and buckets to clients. Control plane 120 may provide a variety of services related to providing object storage functionality, including the management of user accounts (e.g., creation, deletion, billing, collection of payment, etc.). Control plane 120 may further provide services related to the creation, usage and deletion of data buckets or objects in response to client requests according to data management 123 and data placement 122. Control plane 120 may also provide services related to the collection and processing of performance and auditing data related to the use of data buckets or objects and snapshots or versions of those buckets or objects.

In at least some embodiments, control plane 120 may implement query coordination 121, which may implement one or more resources for managing the performance of queries to a data object. For example, a coordination node (not illustrated) may receive and direct requests to storage hosts 130 that store respective portions of a data object). The coordination node may collect and combine results received from queries to the individual storage hosts and return a query result to a client (e.g., 102), in some embodiments. Query coordination 121 may determine whether parallelization of a query request can be performed and direct the performance of range processing at individual storage hosts in order to parallelize the performance of different portions of a query, in some embodiments.

Clients 102 may encompass any type of client configurable to submit requests to provider network 100. For example, a given client 102 may include a suitable version of a web browser, or may include a plug-in module or other type of code module configured to execute as an extension to or within an execution environment provided by a web browser. Alternatively, a client 102 may encompass an application such as a database application (or user interface thereof), a media application, an office application or any other application that may make use of compute instances to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 102 may be configured to generate network-based services requests according to a Representational State Transfer (REST)-style network-based services architecture, a document- or message-based network-based services architecture, or another suitable network-based services architecture. In some embodiments, a client 102 (e.g., a computational client) may be configured to provide access to a compute instance 102 in a manner that is transparent to applications implement on the client 102 utilizing computational resources provided by the compute instance. Client(s) 102 may be associated with particular user accounts, user identifiers, or other information which may indicate the access rights, resources, and other associated information maintained at multi-tenant provider network 100 on behalf of a client 102.

Clients 102 may convey network-based services requests to provider network 100 via external network 101. In various embodiments, external network 101 may encompass any suitable combination of networking hardware and protocols necessary to establish network-based communications between clients 102 and provider network 100. For example, a network 101 may generally encompass the various telecommunications networks and service providers that collectively implement the Internet. A network 101 may also include private networks such as local area networks (LANs) or wide area networks (WANs) as well as public or private wireless networks. For example, both a given client 102 and provider network 100 may be respectively provisioned within enterprises having their own internal networks. In such an embodiment, a network 101 may include the hardware (e.g., modems, routers, switches, load balancers, proxy servers, etc.) and software (e.g., protocol stacks, accounting software, firewall/security software, etc.) necessary to establish a networking link between given client 102 and the Internet as well as between the Internet and provider network 100. It is noted that in some embodiments, clients 102 may communicate with provider network 102 using a private network rather than the public Internet. In some embodiments, clients of object storage service 110 may be internal to provider network 100 (e.g., applications, systems, or other components hosted at one or more of other service(s) 190, which may store, query, or otherwise access data objects in object storage service 110).

A storage host 130 may control any number of storage devices 131. Each storage device 131 may be an isolated failure domain, with its own filesystem components, memory buffer pools, etc. Clients 102 may interact with a storage host 130 through a remote procedure call (RPC) interface or application programming interface (API) 138 that may be shared across all storage devices 131. The API/RPC interface 138 may provide request-plane calls such as put, get, two-phase delete, and so on. The API/RPC interface 138 may also provide a control plane interface including fingerprinting for repair and bulk shard migration for heat management.

Each storage host 130 may implement a filesystem 136 which may subsequently provide index 134 and data store 135 components to provide a key-value PUT and GET interface mapping shard IDs to shard data. The filesystem 136 may provide services for reclamation in the data store 135. The callback does a reverse lookup in the index to determine if a chunk is still referenced by a live shard, and if so, updates its inode to point to the relocated chunk. The index 134 and data store 135 components may then use the extent store 139 for persistent storage of data.

The storage host 130 may maintain and on-disk index as a log-structured merge tree (LSM-tree) whose on-disk component is stored using extent store 139. The index 134 maps shard IDs to inodes holding a shard's data store locators. While an LSM-tree may generate a series of sequential writes that may be routed directly to an extent, the extent store 139 may be provided to reduce overall code size and provide infrastructure for caching extents. The index 134 may, in some embodiments, use a private instantiation of the extent store so that LSM-tree compactions to disk are performed within a single thread, allowing a series of extent writes to remain effectively sequential when they reach storage devices 131.

The data store 135 may store all shard data via the extent store 139. It may in some embodiments divide shard data, which may be larger than a single extent, into extents to be stored separately in the extent store and my apply framing to make ranged reads efficient.

Storage hosts 130 may divide storage devices 131 into extents as a unit of space allocation. Each extent may be a contiguous region of independently addressable blocks of persistent storage. Successive write operations within each extent may be entirely sequential, tracked by a write pointer defining the next valid write position, in some embodiments. The write pointer may contain any valid addressable block address within an extent, ranging from the first addressable block to the last addressable block, in some embodiments, and may include an invalid block address, typically one value beyond the last addressable block, not within range of addressable blocks for the extent indicating that no further write operations are allowed. Any independently addressable blocks starting with the addressable block identified by the write pointer and continuing through the end of the extent range may not contain readable data. Any write to the extent may write data sequentially with respect to the previous write to the extent starting at the write pointer and may advance the write pointer by a number of blocks written.

Each extent may have a reset operation to return the write pointer to the beginning of the extent to allow overwrites. Once reset, an extent may have no readable data until at least one write operation is performed on the extent to advance the write pointer. When using shingled magnetic recording (SMR) disks as storage devices 131, extents may map one-to-one to the zoned block command (ZBC) definition of sequential, write-only zones, in some embodiments. In other embodiments, when using SMR disks as storage devices 131, extents may map one-to-one to groups of ZBC sequential, write-only zones such that individual extents are implemented using multiple ZBC zones. When using conventional, non-SMR disks as storage devices 131, storage hosts 130 may use extents to emulate SMR behavior, in some embodiments, and may store write pointers for various extents in the superblock 133.

The index 134 and data store 135 may acquire free extents from the extent store 135 which may record extent ownership in the superblock 133. When a storage host 130 first initializes, various components of the storage host 130 may query the extent store 139 to discover owned extents and initialize from them. When a component no longer requires an extent, it may reset the extent's write pointer and record the extent as unowned in the superblock records, in some embodiments. In addition, when an extent is allocated, the storage host may increment an incarnation value for the extent. Rather than using a logical block address (LBA) when accessing an extent, the index 134 and data store 135 may use an <extent, incarnation value, offset) tuple and convert this tuple to an LBA only after validating that the given incarnation value is current for that extent in some embodiments. If a component incorrectly retains a stale reference to a disk location, it will thus be unable to access that disk location, in some embodiments.

A first number of extents for each storage device 131 may be reserved for the superblock 133 and the extent store may journal metadata updates into them with frequent snapshots. The superblock 133 may store extent allocation data and identifying data for the disk and the host it belongs to. In addition, in some embodiments, write pointer data for extents may be stored in extents reserved for the superblock 133.

Other than the superblock 133, all persistent data storage may be provided by instances of the extent store 139. The extent store 139 may, in some embodiments, provide a simple object storage abstraction with PUT(data)→locator and GET(locator)→data interfaces. Locators are opaque identifiers generated by the chunk store comprising an <extent, incarnation, offset> tuple and a chunk size.

The extent store 139 may provide disk space management for the storage host 130 in some embodiments. The extent store 139 may acquire extents as necessary to store new chunks. When an extent store client is finished with an extent, the storage may not be recovered immediately. Instead, the extent store 139 has a reclamation, or garbage collection, background task. Reclamation may select an extent allocated to the extent store and scan it to find all data it stores. For each chunk of stored data, reclamation may invoke a client-supplied callback. If the client wishes to retain the chunk, the extent store may relocate the chunk to a new extent and provide a new locator to the client. Otherwise the extent store 139 may simply advance to the next chunk, in some embodiments. Once the entire extent has been scanned, it may be released back to the extent manager for reuse, effectively deleting all chunks that client(s) chose not to retain. The chunk store may enforce a crash-consistent ordering for chunk relocations, locator updates, and extent resets.

In some embodiments, storage hosts 130 may include a buffer cache 132 to assist in buffering writes and in the generating of metadata such as data checksums. Using a buffer cache 132, the storage host may further reduce the IO density required of the storage devices 131.

Figure 2:
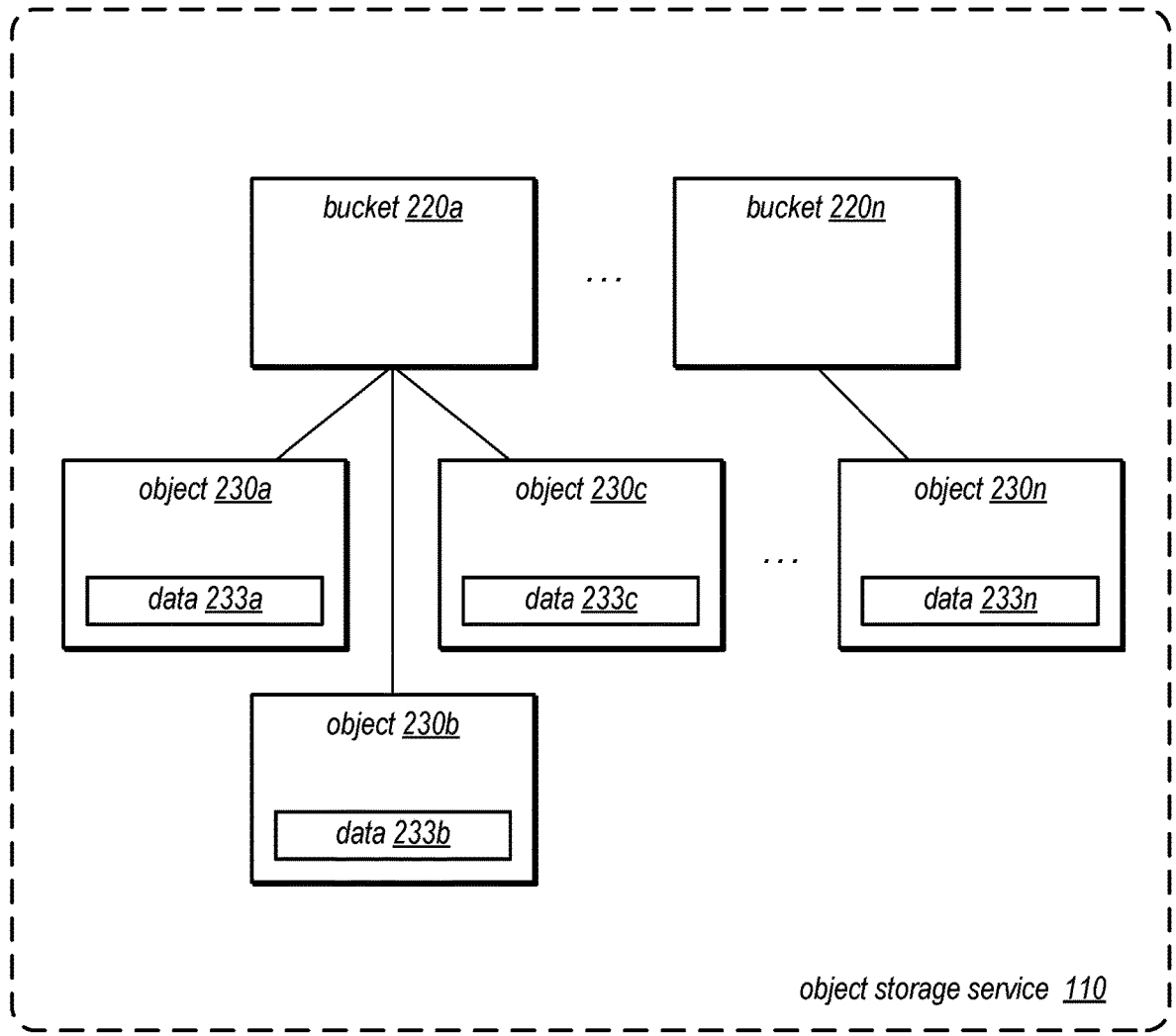
FIG. 2 is a logical block diagram illustrating an object storage scheme for an object storage service, according to some embodiments.

FIG. 2 is a logical block diagram illustrating an object-based storage scheme for an object storage service, according to some embodiments. Object storage service 110 may provide unstructured object storage model for providing virtualized storage resources to clients as a service, as illustrated in FIG. 1. In the illustrated model, storage service interface 124 provides a client-facing interface to object storage service 110. Storage service interface 124 may, for example, be implemented as, or alternatively may include, an application programming interface (API). According to the model presented to a client (e.g., clients 102 in FIG. 1) by interface 124, the storage service may be organized as an arbitrary number of buckets 220a-n accessible via interface 124 which may be hosted across storage hosts 130 in FIG. 1. Each bucket 220 may be configured to store an arbitrary number of objects 230a-n, which in turn may store data 233a-n specified by a client of the storage service 110. One or more clients may submit requests to the storage service interface to store, retrieve, and, as described in more detail below, perform one or more operations on data objects 230a-n. Storage service interface may provide responses to the requests, which may include acknowledgements and/or retrieved data, for example. Generally, in addition to storage and retrieval of data objects, the requests or commands that the storage service 110 may perform may include commands that modify or update data within the storage service 110. In this way, the clients are not burdened with removing the data from the storage service 110, performing the operations, and then returning the modified data to the storage service. This configuration may save network bandwidth and processing resources for the clients, for example. In some embodiments, the object storage service 110 may be configured to internally replicate data objects for data redundancy and resiliency purposes.

In some embodiments storage service interface 124 may be configured to support interaction between the object storage service 110 and its clients according to a web services model. For example, in one embodiment, interface 124 may be accessible by clients as a web services endpoint having a Uniform Resource Locator (URL) to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

In some embodiments, an object storage service 110 may provide read-after-write consistency for new data objects 230 when stored to the buckets 220. Read-after-write consistency for new objects 230 means that immediately after a write operation for a new object 230, the service 110 guarantees that the object 230 will be returned in response to a read operation. However, in some embodiments, an object storage service 110 may not guarantee that a new data object 230 will be immediately available for reads after a write operation. These embodiments thus provide eventual consistency for new data objects 230, rather than read-after write consistency.

In some embodiments, an object storage service 110 may provide eventual consistency for updates of existing objects 230 in the buckets 220. After an update operation is performed on an existing data object 230, it may take some period of time, generally seconds or minutes but possibly even hours or days, for the change to propagate to all instances of the data object 230. Thus, in some embodiments, the object storage service 110 may not guarantee that an access of a data object 230 stored in the storage service 110 will always return a latest or most recent version of the data object 230. This property of a storage service such as object storage service 110 may be referred to as eventual consistency, as a modified data object 230 is generally guaranteed to be only eventually consistent across all instances.

Figure 3:
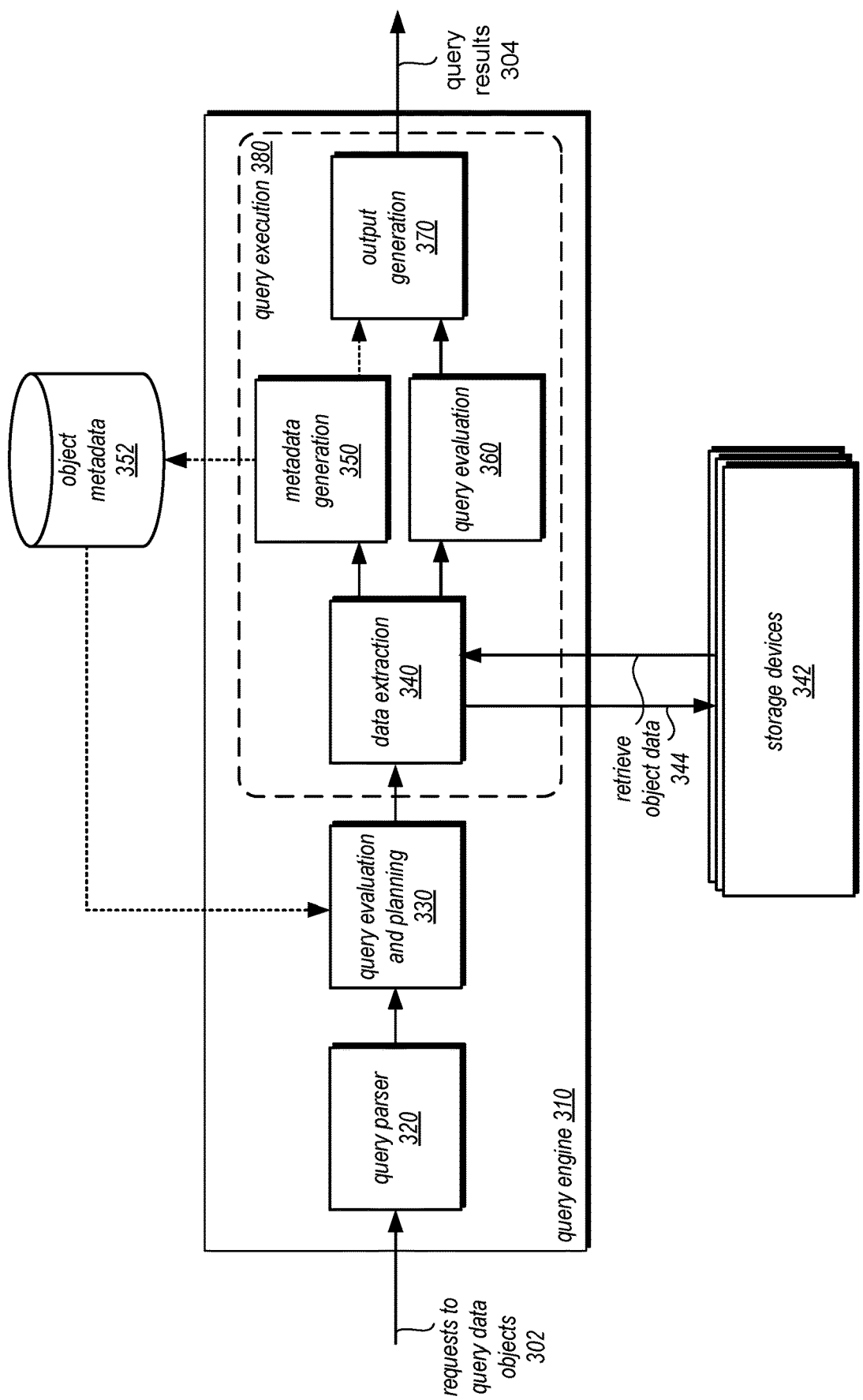
FIG. 3 is a logical block diagram illustrating a query engine that generates and applies metadata for queries, according to some embodiments.

FIG. 3 is a logical block diagram illustrating a query engine that generates and applies metadata for queries, according to some embodiments. Query engine 310 may be implemented as part of storage hosts, as discussed above with regard to FIG. 1 in order to perform queries (or portions thereof) where the data object is located instead of moving the data object. Query engine 410 may receive requests to query data objects 302, in various embodiments. The query requests may be received, in some embodiments, from a coordination node or subsystem implemented as part of the control plane for object storage service 110, in some embodiments, as discussed above with regard to FIG. 1.

In at least some embodiments, query engine 310 may implement query parser 320 to receive a query statement other conditions or criteria for evaluating the data object with respect to the query and generated a parsed version of the query that may be evaluated, planned, optimized, and performed by query engine 310. For example, in some embodiments, a query statement may be converted to a set of tokens by a lexical analysis (which may perform operations such as whitespace removal, case normalization, and so on). The tokens may then be transformed by query parser 320 into a parse tree (e.g., an abstract syntax tree (AST) according to a parsing technique (e.g., recursive decent parser or other top-down parser, such as Top-Down Operator Precedence (TDOP) Pratt parser).

Query engine 310 may implement query evaluation and planning 330 in order to evaluate the operations of the query. In some embodiments, one or multiple plans may be generated by query planning and evaluation 330 according to cost prediction models to select the best plan. In some embodiments, object metadata 352 generated from previous queries may be used to modify the plan operations. In some embodiments, query planning and evaluation may include determining which fields to materialize. Query planning and evaluation 330 may utilize object metadata to determine record boundaries or offsets for performing range queries or a portion of a query in parallel (which may also be distributed to other storage hosts with other query engine performing other ranges).

Query evaluation and planning 330 may generate a final query plan to perform the query and submit it to query execution platform 380, which may include various features to perform the plan including, but not limited to, data extraction 340, metadata generation 350, query evaluation 360, and output generation 370). In some embodiments, the final query plan may be output as code, executables, or other instructions that may be consumed or otherwise input and performed by query execution platform 380.

Data extraction 340 may retrieve object data 344 from storage devices 342. In some embodiments, data extraction may implement different data parsers for different formats of data (e.g., CSV, AVRO, JSON, Parquet, etc.). In some embodiments only identified fields of data records may be materialized in order to reduce the costs of extracting and parsing data. The extracted data may, in some embodiments be provided to metadata generation 350.

Metadata generation 350 may perform various analyses or techniques to collect different kinds of metadata. For example, metadata generation 350 may determine the number of values, distribution of values, or other table statistics, or may determine features of the structure of the data such as record boundaries or offsets, or logical information such as table schema information like column names, column data types, etc.). Metadata generation 350 may store the metadata in object metadata 352, in some embodiments and/or output some or all of the metadata, as discussed below.

Query evaluation 360 may evaluate retrieved and parsed object data with respect to query predicates or other criteria in order to identify data that satisfies the query in order to be included in a result of the query. In some embodiments, query evaluation 360 may implement various kinds of filtering or search functionalities in addition to or instead of query functionalities (e.g., syntax similar to that used for the Linux "grep" utility, in which regular expressions are used to indicate the subset of records to be retrieved, may be employed). In at least one embodiment, a program that is to be invoked at or by the object storage service to determine whether a given record is to be included in a result set may be specified by the client in the request to query (which may be invoked by query evaluation 360). Such a program may, for example, be executed using an event-driven computing service of a provider network that performs functions, operations, or previously provided executables in response to requests that trigger the performance of the functions, operations, or previously provided executables. In a scenario in which a client indicates a program to be used to filter record contents, the logic of the program may remain opaque to the service in at least some embodiments—that is, the conditions or predicates that are being evaluated by the program may not be exposed or revealed to the service.

Output generation 370 may format, combine, and or send query results 304 (and metadata if applicable), in various embodiments. In some embodiments, query results 304 may be combined at a coordination node or other component of query coordination 121 before transmission to a client. Whereas in other embodiments, query results 304 may be sent directly to a requesting client.

Figure 4:
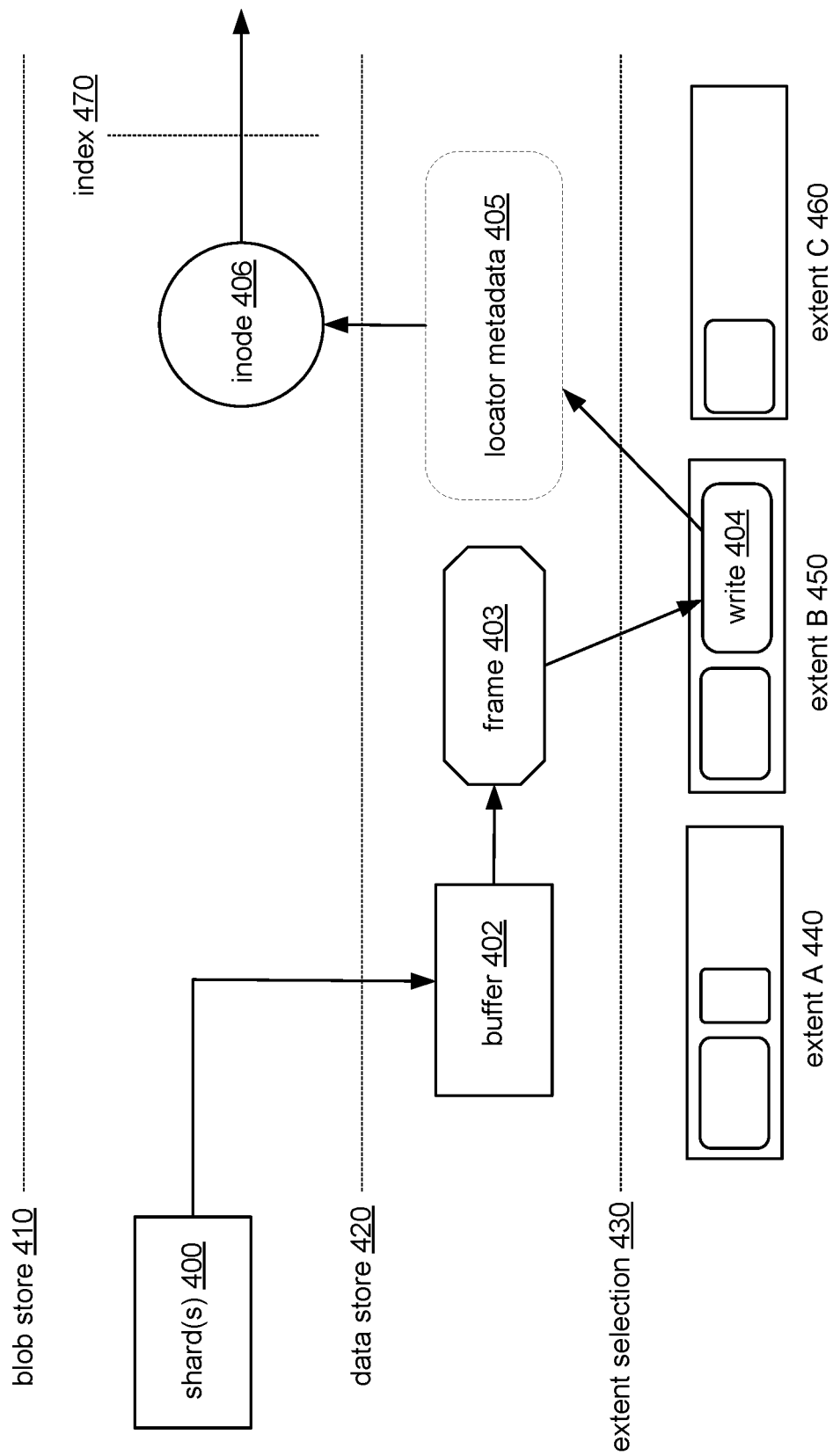
FIG. 4 is a logical block diagram illustrating the data flow of PUT operation for an object store, according to some embodiments.

FIG. 4 is a logical block diagram illustrating the data flow of PUT operation for an object store, according to some embodiments. Object data may be written to a blob store 410 of a particular storage device, such as the storage device 131 of FIG. 1, of an object storage service, such as the object storage service of FIG. 1, using a PUT operation, resulting in one or more shard(s) 400 sent to a data store 420, such as a storage host 130 as shown in FIG. 1, in some embodiments. PUT data received at the data store 420 may be buffered 420, such as in the buffer cache 132 of FIG. 1. Upon receiving and end of data transmission or upon accumulating a threshold amount of data, the buffered data is framed, including generation of metadata including a checksum, as shown in 403, and written 404 to an extent selected in 430 from among extents including extent A 440, extent B 450 and extent C 460. Note that any number of extents may be employed and the example of three extents us chosen for simplicity and is not intended to be limiting.

Writing of the framed data 404 may then generate locator metadata 405 which may then contribute to inode data 406 which may be subsequently incorporated into an index structure 470, such as the index 134 as shown in FIG. 1.

Figure 5:
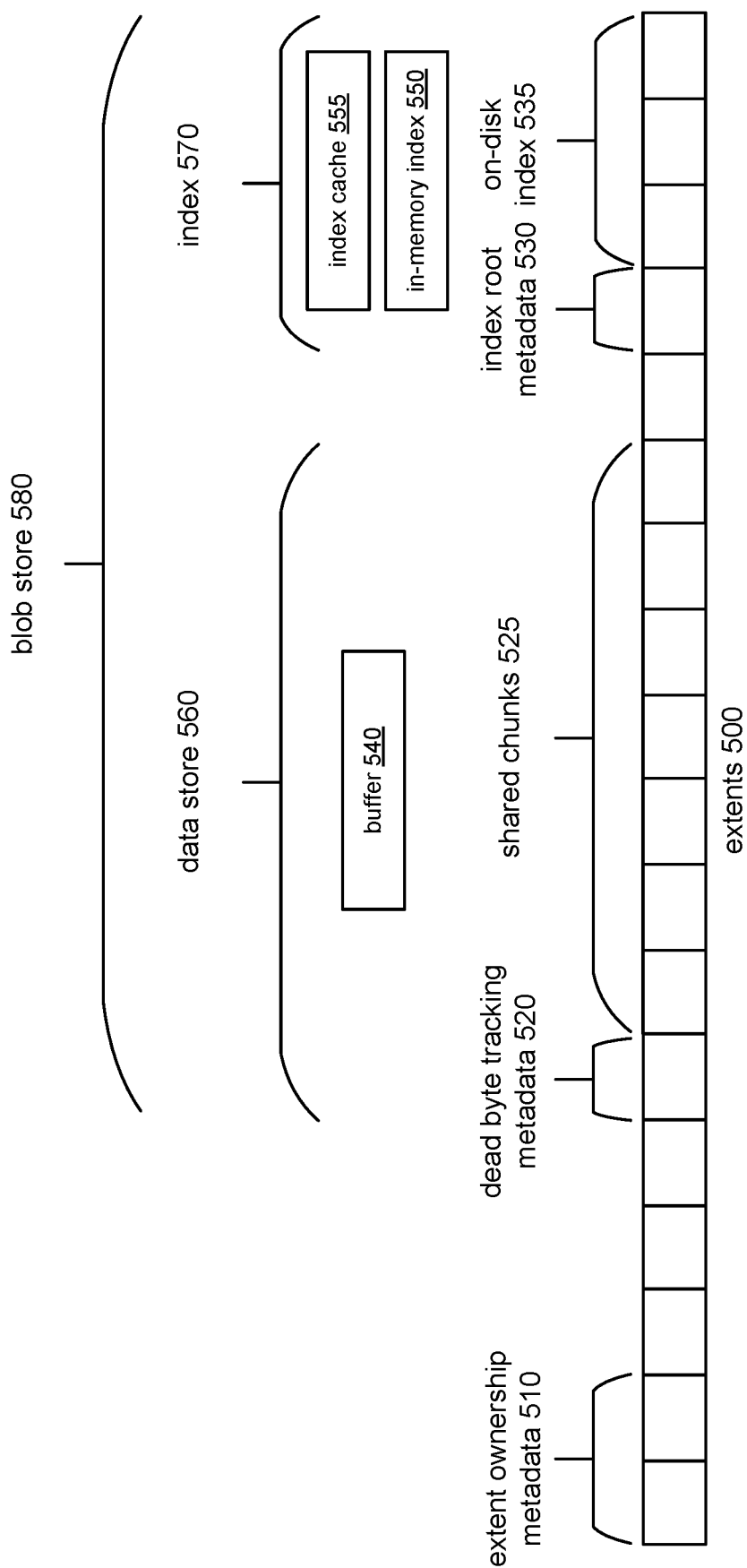
FIG. 5 is a logical block diagram illustrating a data layout for a storage device implementing sequential update operations to minimize input-output density, according to some embodiments.

FIG. 5 is a logical block diagram illustrating a data layout for a storage device implementing sequential update operations to minimize input-output density, according to some embodiments. A blob store 580, such as the blob store 410 shown in FIG. 4, may provide an extent ownership management system implemented using extent ownership metadata 510. Each extent of extents 500 may be owned by a single logical component, in some embodiments. The owner of each extent is recorded in the extent ownership metadata 510 which is stored in a first number of extents of the storage device. The location of this metadata may be fixed such that it is in a known location and all other components may initialize using this ownership information. Multiple extents may be used, in some embodiments, so that a known-good copy of the extent ownership metadata 510 may always be kept in one extent while others are being reset.

Shard data may be stored in the data store 560, which may buffer 540 incoming shard data in memory and flush it in chunks to extents it owns, as discussed earlier in FIG. 4. The list of chunk locations may be stored in the shard's inode, such as the inode 406 of FIG. 4, in the index 570. To facilitate efficient reclamation, the data store 560 may persist a count of accumulated dead bytes that may exist for each extent it owns in the dead byte tracking metadata 520, in some embodiments.

The Index 570 may store mappings between shard identifiers and the list of chunk locations at which the shard data can be found. New index mutations (both inserts and deletes) may be buffered in an in-memory index 550 and may be merged into the on-disk index 535 asynchronously. An index root metadata 530 may maintain a mapping from key ranges to leaf nodes. Additionally, an index cache 550 may be incorporated into the index 570 to cache all or portions of the index on one or more additional storage devices such solid state drives (SSDs), in some embodiments. For workloads that are index intensive, implementing such an index cache may be valuable in lowering the IO density of the storage devices by reducing the rate of read accesses performed on the on disk index.

Figure 6:
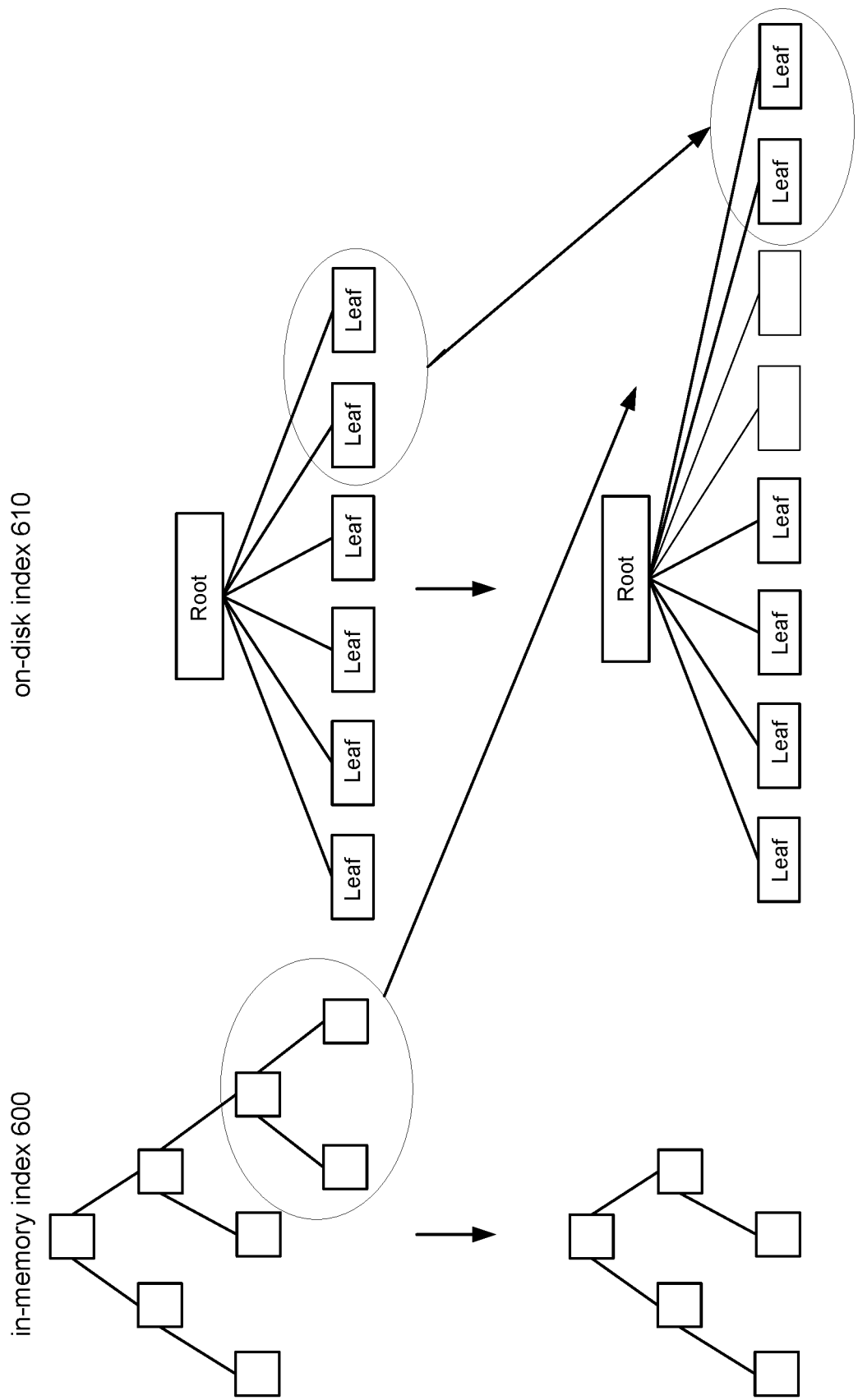
FIG. 6 is a logical block diagram illustrating an index implemented using log-structured merge tree, according to some embodiments.

FIG. 6 is a logical block diagram illustrating an index implemented using log-structured merge tree, according to some embodiments. And index, such as the index 134 as shown in FIG. 1, may store a flat on-disk tree 610 consisting of only a root node and multiple leaf nodes. The index may be partitioned into an in-memory index 600 and an on-disk index 610, in some embodiments. Mutations to the index may be inserted in some embodiments into the in-memory index 600 and asynchronously merged onto the on-disk index 610. The merge process may be initiated, in some embodiments, whenever the size of the in-memory index exceeds a certain size threshold or a period of time has elapsed.

The merge process may identify a group of leaf nodes representing a contiguous key range that maximizes the number of in-memory updates in that range. The updates may be applied and the data reserialized into a group of leaves and written to a extent. The old, unreferenced leaf nodes may be cleaned up in an identical process during data store extent reclamation. Updates to the tree may be serialized in the tree root, which may then be store in the index root metadata, such as the index root metadata 530 as shown in FIG. 5.

FIG. 7 is a flow chart illustrating a method of implementing storing of a data object using sequential update operations to minimize input-output density, according to some embodiments. As shown in 800, the method may first implement an extent store, such as the extent store(s) 139 of FIG. 1, by configuring multiple extents implemented using one or more storage devices, such as the persistent storage devices 1860 as discussed below in FIG. 13 or storage devices 131 as shown in FIG. 1. Individual extents may be contiguous regions of independently addressable blocks of persistent storage which may be updatable sequentially using a series of write operations.

Successive writes within each extent may be entirely sequential, tracked by a write pointer defining the next valid write position, in some embodiments. The write pointer may contain any valid addressable block address within an extent, ranging from the first addressable block to the last addressable block, in some embodiments, and may include an invalid block address, typically one value beyond the last addressable block, not within range of addressable blocks for the extent indicating that no further write operations are allowed. Any independently addressable blocks starting with the addressable block identified by the write pointer and continuing through the end of the extent range may not contain readable data. Any write to the extent may write data sequentially with respect to the previous write to the extent starting at the write pointer and may advance the write pointer by a number of blocks written.

The method may then implement a data store, such as the data store 134 of FIG. 1, and an index store 820, such as the index store 135 of FIG. 1, using respective portions of the extent store. Successive writes to the data store and index store may be entirely sequential, tracked by respective write pointers, in some embodiments.

As shown in 820, the method may then receive a request to write an object, such as through the API/RPC interface 138 of FIG. 1. Once the request is received, as shown in 830, the object may be written to the data store with the object divided into one or more portions, each portion written to an individual extent sequentially using a series of write operations starting at the write pointer for the respective extent, as discussed earlier in FIG. 4 and discussed further in FIG. 8.

Figure 9:
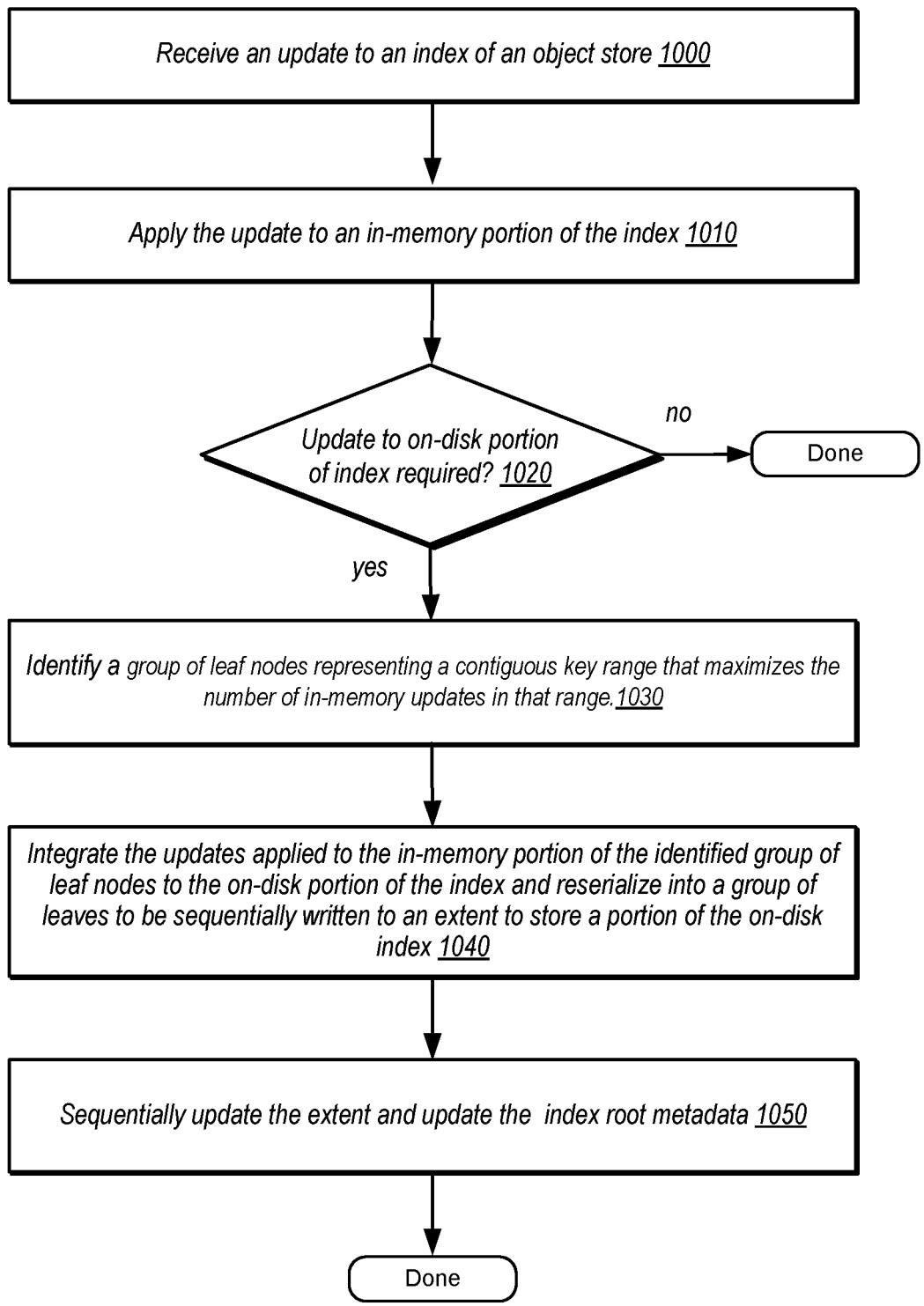
FIG. 9 is a flow chart illustrating a method of updating an index of an object store device that implements sequential update operations to minimize input-output density, according to some embodiments.

Once the object has been written to the data store, as shown in 840, an index stored in the index store may then be updated to identify the object stored in the data store, the update performed as discussed earlier in FIG. 5 and discussed further in FIG. 9.

Figure 8:
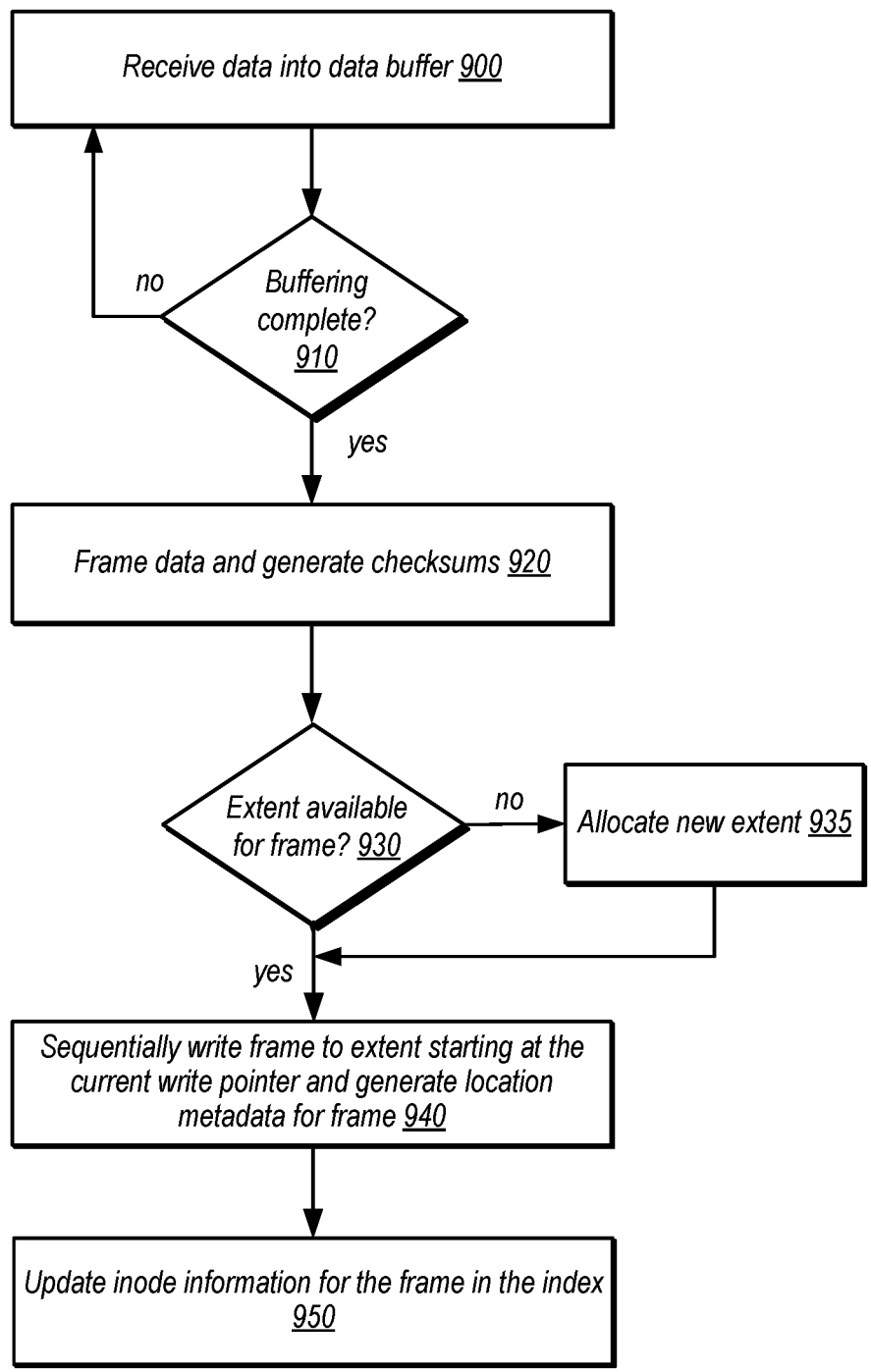
FIG. 8 is a flow chart illustrating a method of putting data to an object store device that implements sequential update operations to minimize input-output density, according to some embodiments.

FIG. 8 is a flow chart illustrating a method of putting data to an object store device that implements sequential update operations to minimize input-output density, according to some embodiments. Data to be written may be received in a data buffer 900, such as the buffer cache 132 of FIG. 1, in some embodiments. In buffering is complete, as shown by a positive exit from step 910, then the method may proceed to step 920. Otherwise, the method may return to step 900. Buffering may be indicated as complete upon receiving and end of data transmission or upon accumulating a threshold amount of data, in various embodiments.

As shown in 920, a data frame may then be generated including metadata for the frame, the metadata including checksums to allow for verification of data integrity of the data frame. Once the data frame is generated, the method may proceed to step 930 where it may be determined whether an extent is available for writing the data frame. If an extent is not available, as indicated by a negative exit from step 930, a new extent may be allocated as shown in 935, and the method may then proceed to step 940. If an extent is available, as indicated by a positive exit from step 930, the method may proceed to step 940. An extent may be identified as suitable to receive the frame in a variety of ways. For example, in one embodiment frames may be written to extents such that most recently written frames are grouped together. In other embodiments, other selection criteria may be used and such examples are not intended to be limiting.

Once an extent is identified or allocated to receive the frame, the frame may then be written sequentially 940 using a series of write operations to the extent starting at a current write pointer. Metadata used to locate the frame in the extent may then generated.

Once the frame has been written to the extent, an inode for the frame including metadata usable to locate the frame may be updated in an index structure, such as the index structure of FIG. 6.

FIG. 9 is a flow chart illustrating a method of updating an index of an object store device that implements sequential update operations to minimize input-output density, according to some embodiments. The method begins at step 1000 when an update to the index, such as index 134 of FIG. 1, of an object store is received. First, as shown in 1010, the update may be applied in some embodiments to an in-memory portion of the index, such as the in-memory index 600 of FIG. 6. Then, as shown in 1020, it may be determined of an update to the on-disk portion of the index such as the on-disk index 610 of FIG. 6, is required. This determination may be made in various ways in different embodiments. For example, in some embodiments an update to the on-disk portion of the index may be required should the size of the in-memory index exceeds a certain size threshold. In other embodiments, an update to the on-disk portion of the index may be required should a period of time since the last update have elapsed. Other determination criteria may be used in various embodiments and such examples are not intended to be limiting.

Should no update to the on-disk portion of the index be required, as indicated by a negative exit from step 1020, then the method is complete. However, should an update to the on-disk portion of the index be required, as indicated by a positive exit from step 1020, then the method may proceed to step 1030 in some embodiments.

As shown in step 1030, a group of leaf nodes may be identified that represents a contiguous range of keys that maximizes a number of in-memory updates in the range. Once a range is identified, as shown in 1040, the updates applied to the in-memory portion of the index may be integrated into data for the on-disk index and the updated data reserialized into a group of leaves that may be sequentially written to an extent to store a portion of the on-disk index. Then, as shown in 1050, the group of leaves is sequentially written to the extent and the index root metadata, such as index root metadata 530 of FIG. 5, updated to reflect the newly written index extent.

Figure 10:
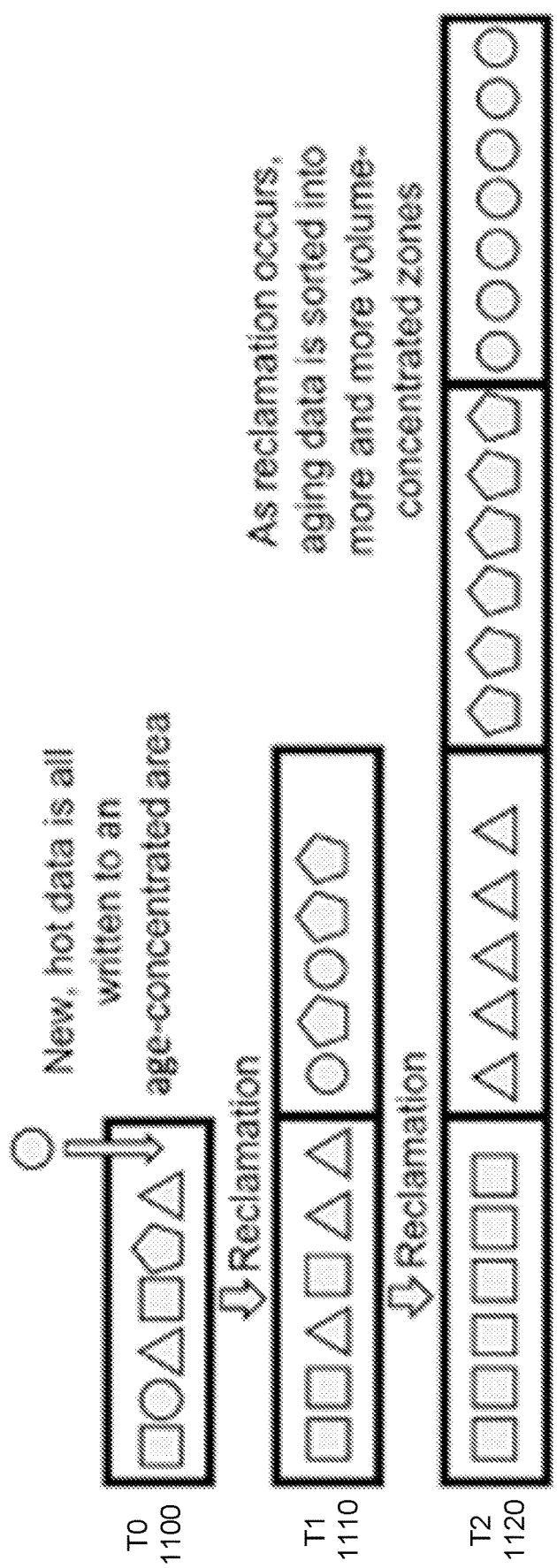
FIG. 10 is a logical block diagram illustrating an evolving organization of object data over time, according to some embodiments.

FIG. 10 is a logical block diagram illustrating an evolving organization of object data over time, according to some embodiments. At an initial time T0, as shown in 1100, data may be organized such that frames of various objects are written in the order that they are received, thus minimizing the number of IO operations required to store the objects as they are received. In applications where client access to data is heavily biased toward newly acquired data. Grouping by age in this manner minimizes IO density and leads to improved efficiency in data reclamation.

However, as data ages but continues to be retained, IO-intensive operations shift the optimal strategy toward grouping like data rather than by age. As shown 1110, at time T1 as data reclamation occurs, like data frames are relocated to be closer in proximity so as to minimize IO requirements when accessing those like data frames. As further shown 1120, at time T2 all data has been migrated from an age-priority grouping to a like-data or volume oriented grouping.

Figure 11:
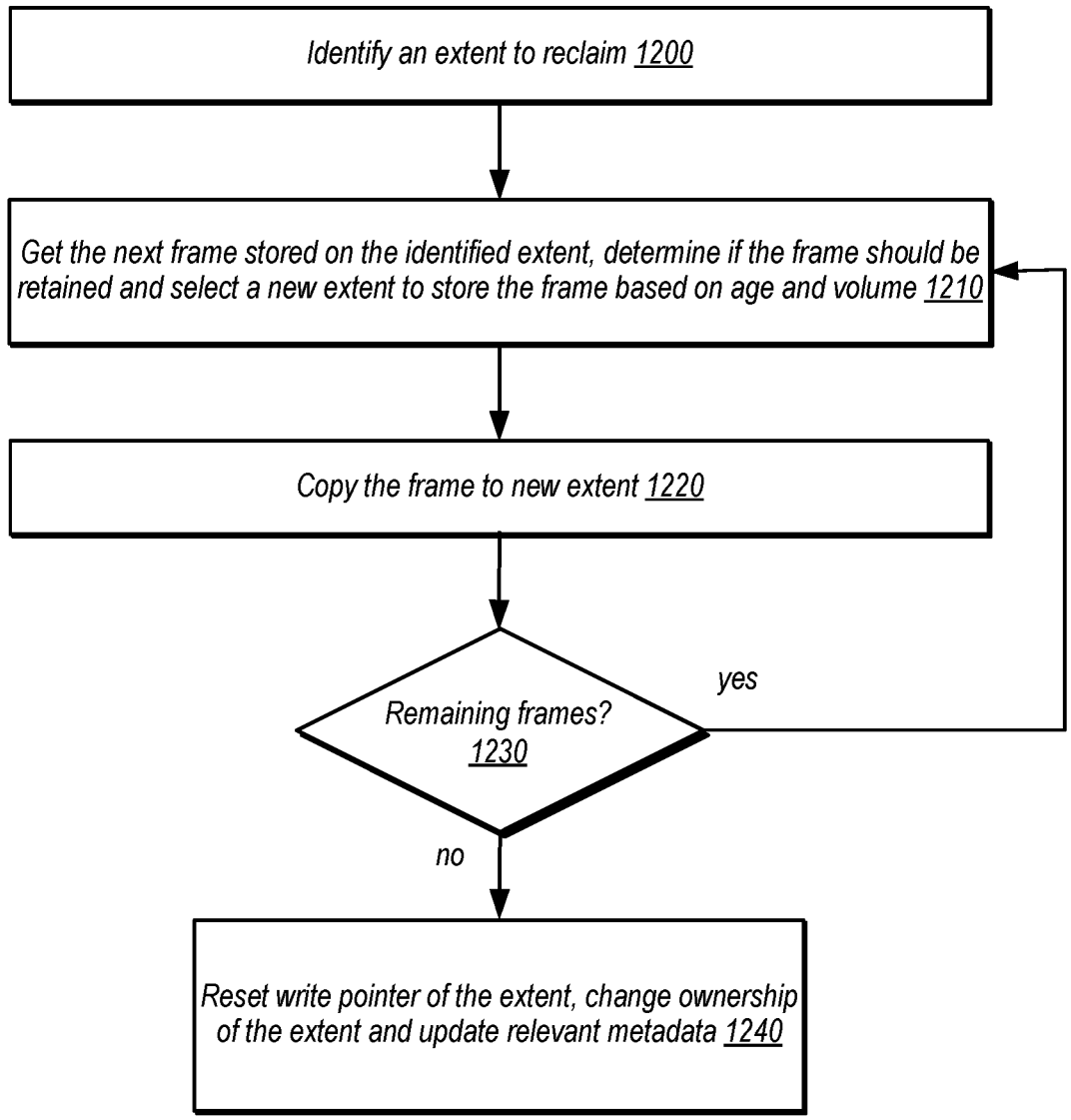
FIG. 11 is a flow chart illustrating a background reclamation task for an object store device that implements sequential update operations to minimize input-output density, according to some embodiments.

FIG. 11 is a flow chart illustrating a background reclamation task for an object store device that implements sequential update operations to minimize input-output density, according to some embodiments. As shown in 1200, an extent may be identified for reclamation based on having a greatest number of dead, or previously deleted, bytes. As discussed earlier in FIG. 5, to facilitate efficient reclamation the data store may persist a count of accumulated dead bytes that may exist for each extent it owns in the dead byte tracking metadata, in some embodiments. These counts may then be used in the identification step of 1200. In some embodiments, additional information may be used in the identification. For example, in some embodiments a preference may be made to select an extent that has been least recently accessed. Other selection criteria may be used in various embodiments and such examples are not intended to be limiting.

For the identified extent, each frame stored in the extent is then identified and a determination is made whether the frame should be retained. If the frame should be retained, then a new extent may be identified to store the extent according to the age of the frame and proximity to other like frames.

Once a new extent is identified, the frame is then copied to the new extent. Then if additional frames remain, as indicated by a positive exit from 1230, the method returns to step 1210. Otherwise, the method proceeds to step 1240.

Once all frames have been copied, as shown in 1240 the extent is reset by updating the current write pointer and made available for reallocation. Finally, relevant metadata for the object store is updated to reflect the change in status for the extent.

Figure 12:
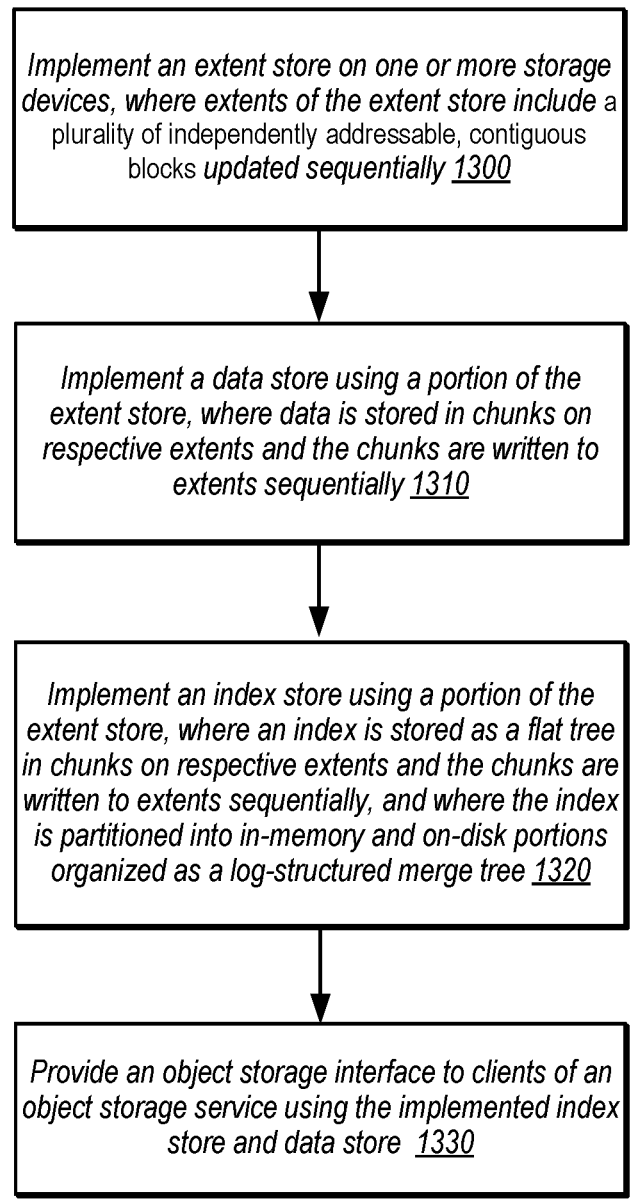
FIG. 12 is a flow chart illustrating a method of implementing an object storage service that implements sequential update operations to minimize input-output density, according to some embodiments.

FIG. 12 is a flow chart illustrating a method of implementing an object storage service that implements sequential update operations to minimize input-output density, according to some embodiments. The method may first implement an extent store 800, such as the extent store(s) 139 of FIG. 1, using multiple extents implemented using one or more storage devices, such as the persistent storage devices 1860 as discussed below in FIG. 12 or storage devices 131 as shown in FIG. 1. Individual extents may be contiguous regions of independently addressable blocks of persistent storage which may be updatable using a series of sequential write operations. Writes within each extent may be largely or entirely sequential, tracked by a write pointer defining the next valid write position, in some embodiments.

The method may then implement a data store 1310, such as the data store 134 of FIG. 1, using a portion of the extent store. Individual ones of portions, or chunks, of a plurality of elements, or blobs, stored in respective extents of the portion of the extent store may be updated by sequentially updating the independently addressable, contiguous blocks of the respective extents using a series of write operations, in some embodiments.

The method may then implement an index store 1320, such as the index store 135 of FIG. 1, using a portion of the extent store. Individual ones of portions of an index stored in respective extents of the portion of the extent store may be updated by sequentially updating the independently addressable, contiguous blocks of the respective extents. The index may be partitioned, in some embodiments, into respective in-memory and on-disk portions, indexes, or subindexes with the overall index organized as a log-structured merge tree.

The method may then provide an object storage interface 1330 to clients of an object storage service using the implemented index store and data store.

The methods described herein may in various embodiments be implemented by any combination of hardware and software. For example, in one embodiment, the methods may be implemented by a computer system (e.g., a computer system as in FIG. 13) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Embodiments of a persistent object storage with sequential updates as described herein may be executed on one or more computer systems, which may interact with various other devices. FIG. 13 is a block diagram illustrating an example computer system, according to various embodiments. For example, computer system 1800 may be configured to implement nodes of a compute cluster, a distributed key value data store, and/or a client, in different embodiments. Computer system 1800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

Computer system 1800 includes one or more processors 1810 (any of which may include multiple cores, which may be single or multi-threaded) coupled to a system memory 1820 via an input/output (I/O) interface 1830. Computer system 1800 further includes a network interface 1840 coupled to I/O interface 1830. In various embodiments, computer system 1800 may be a uniprocessor system including one processor 1810, or a multiprocessor system including several processors 1810 (e.g., two, four, eight, or another suitable number). Processors 1810 may be any suitable processors capable of executing instructions. For example, in various embodiments, processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA. The computer system 1800 also includes one or more network communication devices (e.g., network interface 1840) for communicating with other systems and/or components over a communications network (e.g. Internet, LAN, etc.). For example, a client application executing on system 1800 may use network interface 1840 to communicate with a server application executing on a single server or on a cluster of servers that implement one or more of the components of the embodiments described herein. In another example, an instance of a server application executing on computer system 1800 may use network interface 1840 to communicate with other instances of the server application (or another server application) that may be implemented on other computer systems (e.g., computer systems 1890).

In the illustrated embodiment, computer system 1800 also includes one or more persistent storage devices 1860 and/or one or more I/O devices 1880. In various embodiments, persistent storage devices 1860 may correspond to disk drives, tape drives, solid state memory, other mass storage devices, or any other persistent storage device. Computer system 1800 (or a distributed application or operating system operating thereon) may store instructions and/or data in persistent storage devices 1860, as desired, and may retrieve the stored instruction and/or data as needed. For example, in some embodiments, computer system 1800 may be a storage host, and persistent storage 1860 may include the SSDs attached to that server node.

Computer system 1800 includes one or more system memories 1820 that are configured to store instructions and data accessible by processor(s) 1810. In various embodiments, system memories 1820 may be implemented using any suitable memory technology, (e.g., one or more of cache, static random access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 1820 may contain program instructions 1825 that are executable by processor(s) 1810 to implement the methods and techniques described herein. In various embodiments, program instructions 1825 may be encoded in platform native binary, any interpreted language such as Java™ byte-code, or in any other language such as C/C++, Java™, etc., or in any combination thereof. For example, in the illustrated embodiment, program instructions 1825 include program instructions executable to implement the functionality of a multi-tenant provider network, in different embodiments. In some embodiments, program instructions 1825 may implement multiple separate clients, server nodes, and/or other components.

In some embodiments, program instructions 1825 may include instructions executable to implement an operating system (not shown), which may be any of various operating systems, such as UNIX, LINUX, Solaris™, MacOS™, Windows™, etc. Any or all of program instructions 1825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1800 via I/O interface 1830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1800 as system memory 1820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1840.

In some embodiments, system memory 1820 may include data store 1845, which may be configured as described herein. In general, system memory 1820 (e.g., data store 1845 within system memory 1820), persistent storage 1860, and/or remote storage 1870 may store data blocks, replicas of data blocks, metadata associated with data blocks and/or their state, configuration information, and/or any other information usable in implementing the methods and techniques described herein.

In one embodiment, I/O interface 1830 may be configured to coordinate I/O traffic between processor 1810, system memory 1820 and any peripheral devices in the system, including through network interface 1840 or other peripheral interfaces. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments, some or all of the functionality of I/O interface 1830, such as an interface to system memory 1820, may be incorporated directly into processor 1810.

Network interface 1840 may be configured to allow data to be exchanged between computer system 1800 and other devices attached to a network, such as other computer systems 1890 (which may implement one or more storage system server nodes, database engine head nodes, and/or clients of the database systems described herein), for example. In addition, network interface 1840 may be configured to allow communication between computer system 1800 and various I/O devices 1850 and/or remote storage 1870. Input/output devices 1850 may, in some embodiments, include one or more display terminals, keyboards, keypads, touchpads, scanning devices, voice or optical recognition devices, or any other devices suitable for entering or retrieving data by one or more computer systems 1800. Multiple input/output devices 1850 may be present in computer system 1800 or may be distributed on various nodes of a distributed system that includes computer system 1800. In some embodiments, similar input/output devices may be separate from computer system 1800 and may interact with one or more nodes of a distributed system that includes computer system 1800 through a wired or wireless connection, such as over network interface 1840. Network interface 1840 may commonly support one or more wireless networking protocols (e.g., Wi-Fi/IEEE 802.11, or another wireless networking standard). However, in various embodiments, network interface 1840 may support communication via any suitable wired or wireless general data networks, such as other types of Ethernet networks, for example. Additionally, network interface 1840 may support communication via telecommunications/telephony networks such as analog voice networks or digital fiber communications networks, via storage area networks such as Fibre Channel SANs, or via any other suitable type of network and/or protocol. In various embodiments, computer system 1800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
    one or more storage devices respectively comprising a plurality of extents, wherein individual ones of the plurality of extents comprise a plurality of independently addressable, contiguous blocks;
    at least one processor; and
    a memory storing program instructions that when executed cause the at least one processor to implement an object store, the object store configured to:
        write the respective independently addressable, contiguous blocks sequentially to update individual ones of the plurality of extents;
        implement a data store using a data portion of the plurality of extents, the data store storing a plurality of elements respectively comprising one or more portions, wherein individual ones of the portions of the plurality of elements are stored in respective extents of the data portion of the plurality of extents, and wherein to update individual ones of the portions of the plurality of elements the object store is configured to update the independently addressable, contiguous blocks of the respective extents of the data portion of the plurality of extents sequentially;

implement an index using an index portion of the plurality of extents, wherein the index identifies the plurality of elements stored in the data store, and wherein to update a portion of respective portions of the index stored on individual ones of the index portion of the plurality of extents the object store is configured to:

identify a group of leaf nodes representing a contiguous key range to maximize a number of in-memory updates to the contiguous key range;

integrate the in-memory updates of the identified group of leaf nodes into index data for the portion of the index;

reserialize the index data into an updated group of leaf nodes to be sequentially written to the portion of the index; and update the independently addressable, contiguous blocks of the index data for the portion of the index sequentially; and provide an object storage interface to clients of the object store using the implemented index and data store.

2. The system of claim 1, the object store further configured to:

implement a background reclamation process, configured to:

copy a plurality of the portions of the plurality of elements to a new extent of the data portion of the plurality of extents, wherein the new extent is contiguously populated with the plurality of the portions, wherein the copying frees at least one of the extents of the data portion of the plurality of extents, and wherein the copying reorganizes at least some of the portions of the plurality of elements according to likelihood of future access.

3. The system of claim 1, the object store further configured to:

implement an index cache using one or more additional storage devices, the index cache configured to:

cache the index on the one or more additional storage devices to reduce the rate of read accesses performed on the index.

4. The system of claim 1, wherein the one or more storage devices are shingled magnetic recording (SMR) storage devices respectively comprising a plurality of recording zones, and wherein individual ones of the plurality of extents correspond to respective groups of one or more of the plurality of recording zones.

5. A method, comprising:

configuring one or more storage devices to provide a plurality of extents respectively comprising a plurality of contiguous, independently addressable blocks, wherein writing data to an extent of the plurality of extents comprises writing the respective independently addressable, contiguous blocks of the extent sequentially;

receiving a request to write an object for a client of an object store via an object storage interface;

writing the object to a data store, the writing comprising writing a portion of the object to a data extent of the plurality of extents sequentially; and updating an index identifying the object in the data store, the updating comprising:

identifying a group of leaf nodes representing a contiguous key range to maximize a number of in-memory updates to the contiguous key range;

integrating the in-memory updates of the identified group of leaf nodes into index data for a portion of the index;

reserializing the index data into an updated group of leaf nodes to be sequentially written to the portion of the index; and writing the portion of the index to an index extent of the plurality of extents sequentially.

6. The method of claim 5, further comprising:

copying the portion of the object to a new extent of the plurality of extents, wherein the new extent is contiguously populated with the portion of the object and at least a second portion of the object, and wherein the copying frees the data extent for reuse.

7. The method of claim 5, further comprising:

caching the index on one or more additional storage devices to reduce the rate of read accesses performed on the index.

8. The method of claim 5, wherein the index is structured according to a log-structured merge tree and is partitioned into at least a first portion resident in memory and a second portion stored in the index portion of the plurality of extents.

9. The method of claim 5, wherein the one or more storage devices are shingled magnetic recording (SMR) storage devices respectively comprising a plurality of recording zones, and wherein individual ones of the plurality of extents correspond to respective groups of one or more of the plurality of recording zones.

10. The method of claim 5, further comprising:

implementing a plurality of superblocks using a superblock portion of the plurality of extents, wherein updating individual ones of the plurality of superblocks comprises updating the independently addressable, contiguous blocks of the respective extents of the superblock portion of the plurality of extents sequentially.

11. The method of claim 10, wherein the one or more storage devices are persistent storage devices respectively emulating the behavior of SMR storage devices using the plurality of extents, and wherein respective write pointers for the plurality of recording zones are maintained in the plurality of superblocks.

12. The method of claim 5, wherein the object store is an object storage service offered as part of a provider network, wherein requests to access data objects stored in the object storage service are received according to an Application Programming Interface (API) for the object storage service.

13. One or more non-transitory computer-accessible storage media storing program instructions that when executed on or across one or more computing devices cause the one or more computing devices to perform:

configuring one or more storage devices to provide a plurality of extents respectively comprising a plurality of contiguous, independently addressable blocks, wherein writing data to an extent of the plurality of extents comprises writing the respective independently addressable, contiguous blocks of the extent sequentially;

receiving a request to store an object for a client of the object store via an object storage interface;

writing the object to a data store, the writing comprising writing at least a portion of the object to a data extent of the plurality of extents sequentially; and updating an index identifying the object in the data store, the updating comprising:

identifying a group of leaf nodes representing a contiguous key range to maximize a number of in-memory updates to the contiguous key range;

integrating the in-memory updates of the identified group of leaf nodes into index data for a portion of the index;

reserializing the index data into an updated group of leaf nodes to be sequentially written to the portion of the index; and writing the portion of the index to an index extent of the plurality of extents sequentially.

14. The one or more non-transitory computer-accessible storage media of claim 13, the program instructions that when executed on or across one or more computing devices cause the one or more computing devices to further perform:

copying the portion of the object to a new extent of the plurality of extents, wherein the copying frees the data extent for reuse.

15. The one or more non-transitory computer-accessible storage media of claim 13, the program instructions that when executed on or across one or more computing devices cause the one or more computing devices to further perform:

caching the index on the one or more additional storage devices using one or more additional storage devices to reduce the rate of read accesses performed on the index.

16. The one or more non-transitory computer-accessible storage media of claim 13, wherein the index is structured according to a log-structured merge tree and is partitioned into at least a first portion resident in memory and a second portion stored in the index portion of the plurality of extents.

17. The one or more non-transitory computer-accessible storage media of claim 13, wherein the one or more storage devices are shingled magnetic recording (SMR) storage devices respectively comprising a plurality of recording zones, and wherein individual ones of the plurality of extents correspond to respective groups of one or more of the plurality of recording zones.

18. The one or more non-transitory computer-accessible storage media of claim 13, wherein the one or more storage devices are persistent storage devices supporting random access writes.

19. The one or more non-transitory computer-accessible storage media of claim 18, the program instructions that when executed on or across one or more computing devices cause the one or more computing devices to further perform:

implementing a plurality of superblocks using a superblock portion of the plurality of extents, wherein updating individual ones of the plurality of superblocks comprises updating the independently addressable, contiguous blocks of the respective extents of the superblock portion of the plurality of extents sequentially, and wherein respective update pointers for the plurality of extents are maintained in the plurality of superblocks.

* * * * *